United States Patent
Fukushige et al.

(10) Patent No.: US 10,988,139 B2
(45) Date of Patent: Apr. 27, 2021

(54) VEHICLE POSITION CONTROL METHOD AND DEVICE VEHICLE POSITION CONTROL DEVICE FOR CORRECTING POSITION IN DRIVE-ASSISTED VEHICLE

(71) Applicant: Nissan Motor Co., Ltd., Yokohama (JP)

(72) Inventors: Takashi Fukushige, Kanagawa (JP); Satoshi Tange, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/641,770

(22) PCT Filed: Aug. 30, 2017

(86) PCT No.: PCT/JP2017/031168
§ 371 (c)(1),
(2) Date: Feb. 25, 2020

(87) PCT Pub. No.: WO2019/043833
PCT Pub. Date: Mar. 7, 2019

(65) Prior Publication Data
US 2020/0377089 A1 Dec. 3, 2020

(51) Int. Cl.
*B60W 30/12* (2020.01)
*B60W 50/02* (2012.01)
*G06K 9/00* (2006.01)

(52) U.S. Cl.
CPC ........ *B60W 30/12* (2013.01); *B60W 50/0225* (2013.01); *G06K 9/00798* (2013.01);
(Continued)

(58) Field of Classification Search
CPC ............ B60W 30/12; B60W 50/0225; B60W 2520/10; B60W 2520/14; B60W 2552/53; G06K 9/00798
See application file for complete search history.

(56) References Cited

U.S. PATENT DOCUMENTS

2008/0027645 A1 1/2008 Okada et al.
2016/0318512 A1* 11/2016 Yamaoka ............... B60W 30/12
(Continued)

FOREIGN PATENT DOCUMENTS

CN 101793528 A 8/2010
CN 105073542 A 11/2015
(Continued)

*Primary Examiner* — Anshul Sood
(74) *Attorney, Agent, or Firm* — Global IP Counselors, LLP

(57) ABSTRACT

A vehicle position correction device is provided with a controller for correcting a position error of an autonomous host vehicle. The controller detects a lane boundary of a lane in which the host vehicle travels. The controller calculates a target value for a lateral correction amount of the target route by comparing positional relationships between lane boundary detection results and the target route on a map, and changes a lateral movement speed of the target route to calculate the target value for the lateral correction amount according to a bearing of the host vehicle in which the bearing being a vehicle attitude angle. The controller corrects the target route by moving the target route sideways in a lateral direction by an amount equal to the lateral correction amount upon the calculation of the lateral correction amount.

6 Claims, 8 Drawing Sheets

(52) U.S. Cl.
CPC ..... *B60W 2520/10* (2013.01); *B60W 2520/14* (2013.01); *B60W 2552/53* (2020.02)

(56) References Cited

U.S. PATENT DOCUMENTS

2017/0123434 A1   5/2017  Urano et al.
2018/0190123 A1*  7/2018  Oka ..................... B62D 6/001

FOREIGN PATENT DOCUMENTS

| CN | 106052705  | A  | 10/2016 |
| CN | 107085938  | A  | 8/2017  |
| JP | 2011-174877 | A | 9/2011  |
| JP | 2015-96824 | A  | 5/2015  |
| JP | 2015-205635 | A | 11/2015 |
| JP | 2017-77849 | A  | 4/2017  |
| JP | 6152069    | B2 | 6/2017  |

* cited by examiner

VEHICLE POSITION CONTROL METHOD AND DEVICE VEHICLE POSITION CONTROL DEVICE FOR CORRECTING POSITION IN DRIVE-ASSISTED VEHICLE

CROSS-REFERENCE TO RELATED APPLICATIONS

This application is a U.S. national stage application of International Application No. PCT/JP2017/031168, filed on Aug. 30, 2017.

BACKGROUND

Technical Field

The present disclosure relates to a method and device for correcting a position error of a drive-assisted vehicle, in which an error is corrected that arises between a position of a host vehicle and a target route during drive-assisted travel.

Background Information

Conventionally, during travel through an intersection, a position in the intersection is calculated through the detection of a pedestrian crossing. One known device for correcting a position of a host vehicle corrects a self-position of the host vehicle when a position in the intersection calculated on the basis of position-in-intersection information in map information is determined to be a position suitable for correcting the self-position of the host vehicle (e.g., see Japanese Laid-Open Patent Application No. 2011-174877—Patent Document 1).

SUMMARY

However, there is a problem with this conventional device in that the application of a correction to the self-position of the host vehicle is limited to intersections with a pedestrian crossing.

The present disclosure focuses on the above problem, it being an object hereof to have a position of a host vehicle after having passed through an intersection via a right or left turn approach a lane center even in intersections without white lines or a pedestrian crossing.

In order to achieve the above objective, in the present disclosure, a controller is provided that corrects error arising between a position of a host vehicle and a target route during drive-assisted travel. In a method for correcting a position error of a drive-assisted vehicle, a lane boundary of a lane in which the host vehicle travels is detected. Positional relationships between a detected lane boundary and the target route on a map are compared to calculate a target value for a lateral correction amount of the target route. A lateral movement speed of the target route at which the target value for a lateral correction amount is to be obtained is changed according to a bearing of the host vehicle, bearing being a vehicle attitude angle, to calculate a lateral correction amount. The target route is moved sideways in a lateral direction by an amount equal to the lateral correction amount to correct the target route.

By changing a target value for a lateral correction amount according to a bearing of the host vehicle, bearing being a vehicle attitude angle, and calculating a lateral correction amount, as described above, a position of a host vehicle after having passed through an intersection via a right or left turn can be made to approach a lane center even in intersections without white lines or a pedestrian crossing.

DETAILED DESCRIPTION OF THE EMBODIMENTS

Figure 1:
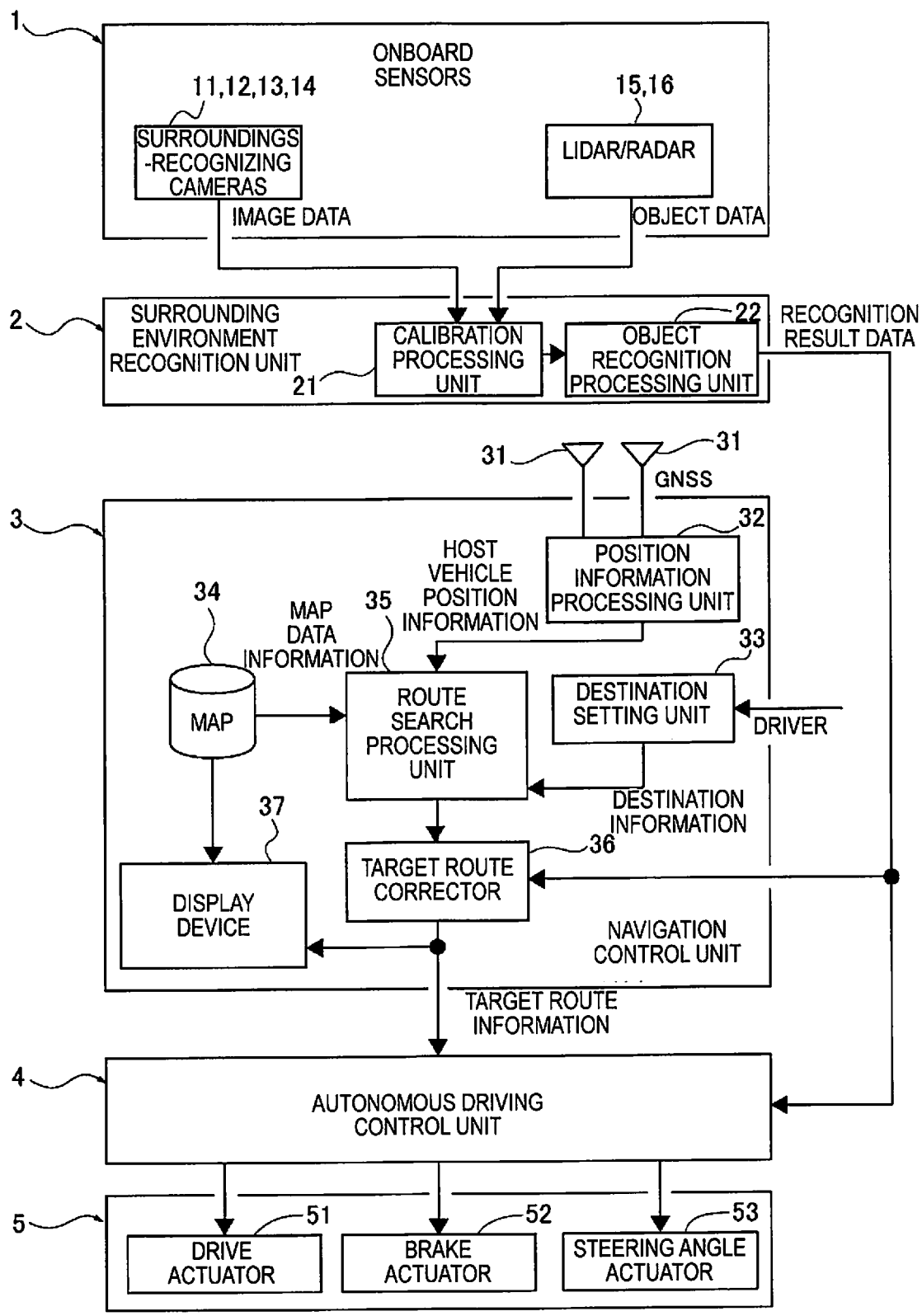
FIG. 1 is an overall system diagram illustrating an autonomous driving control system to which a method and device for correcting a position error of the first embodiment have been applied.

A preferred embodiment for implementing a method and device for correcting a position error of a drive-assisted vehicle according to the present disclosure will be described below with reference to the first embodiment illustrated in the drawings.

First Embodiment

First, the configuration will be described. The method and device for generating a target method and device for correcting a position error of a first embodiment are applied to an autonomous vehicle (one example of a drive-assisted vehicle) in which steering/drive/braking are automatically controlled according to an autonomous driving mode selection using target route information generated by a navigation control unit. The configuration of the first embodiment will be described under the headings "Overall system configuration," "Detailed configuration of navigation control unit," and "Overall configuration of target route corrector,"

"Detailed configuration of lateral correction amount calculation unit," and "Detailed configuration of rate limiter unit."

Overall System Configuration

Figure 2:
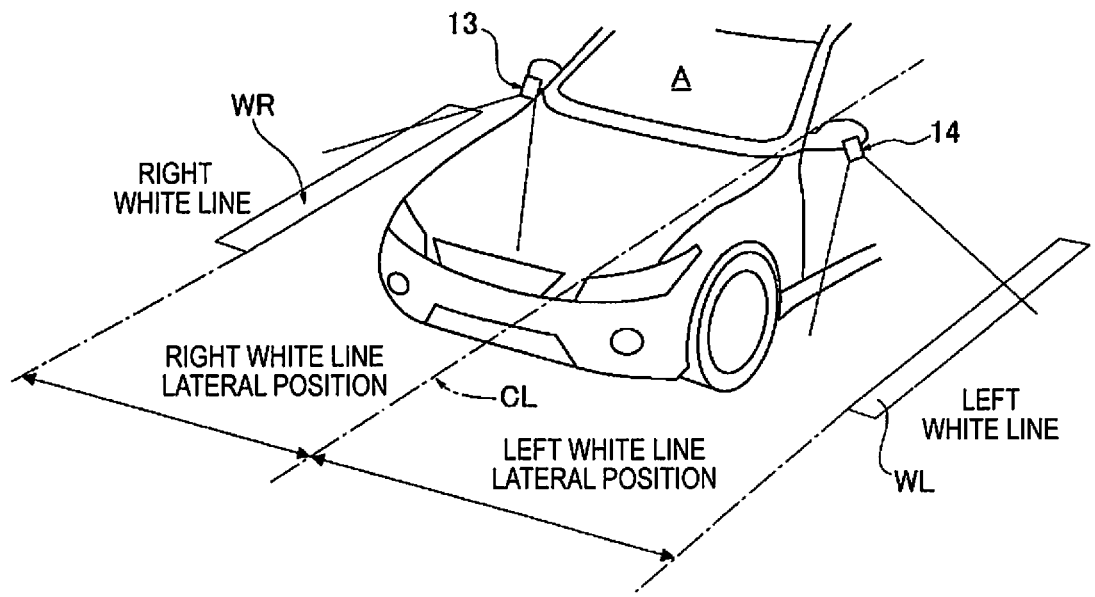
FIG. 2 is a perspective view illustrating, among onboard sensors, a left recognition camera and a right recognition camera of a first embodiment.
Figure 3:
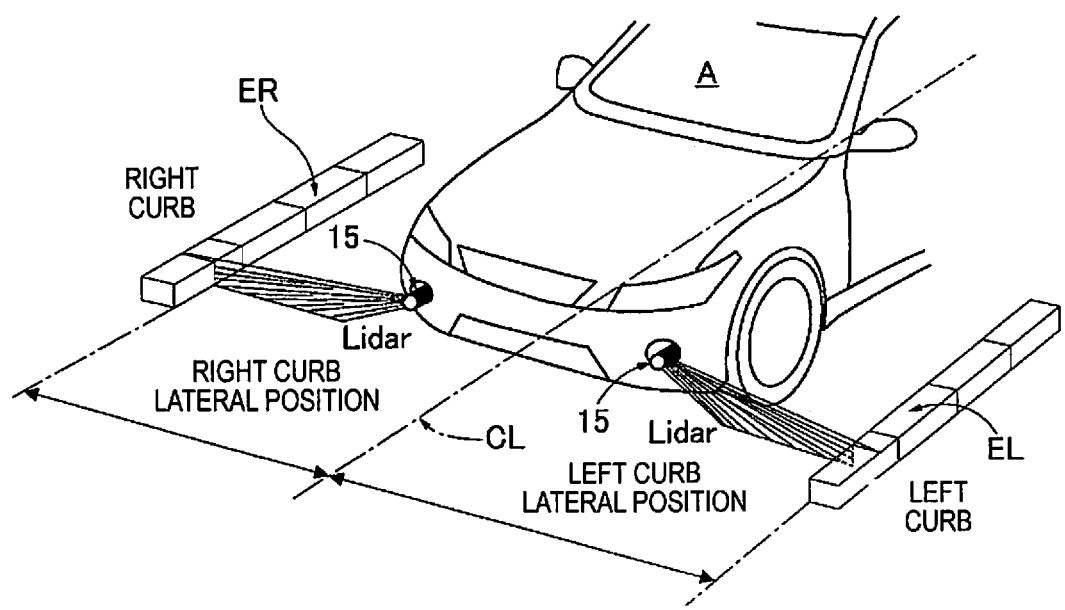
FIG. 3 is a perspective view illustrating, among onboard sensors, lidar provided at left and right positions at the front of a vehicle of the first embodiment.

FIG. 1 illustrates an autonomous driving control system to which the method and device for correcting a position error of the first embodiment have been applied. FIG. 2 illustrates, among onboard sensors, a left recognition camera and a right recognition camera. FIG. 3 illustrates, among onboard sensors, lidar provided at left and right positions at the front of a vehicle. The overall system configuration will be described below with reference to FIGS. 1 to 3.

As illustrated in FIG. 1, the autonomous driving control system comprises onboard sensors 1, a surrounding environment recognition unit 2, a navigation control unit 3, an autonomous driving control unit 4, and actuators 5. The surrounding environment recognition unit 2, the navigation control unit 3, and the autonomous driving control unit 4 are computers that comprise a CPU or other processing unit and execute arithmetic processing.

The onboard sensors 1 are sensors that are mounted on an autonomous vehicle and acquire information about the surroundings of the host vehicle. The onboard sensors 1 include a forward recognition camera 11, a rear recognition camera 12, a right recognition camera 13, a left recognition camera 14, lidar 15, and radar 16. The onboard sensors 1 include, as sensors that acquire information required for autonomous driving control other than information about the surroundings of the host vehicle, a vehicle speed sensor, a gyro sensor, a turn signal switch, etc. (none of which are illustrated).

In combination, the forward recognition camera 11, the rear recognition camera 12, the right recognition camera 13, and the left recognition camera 14 configure a surroundings-recognizing camera (around view monitor (AVM)). This surroundings-recognizing camera detects objects in a travel path of the host vehicle, objects outside of the travel path of the host vehicle (road structures, leading vehicles, trailing vehicles, oncoming vehicles, neighboring vehicles, pedestrians, bicycles, motor bikes), the travel path of the host vehicle (white road lines, road boundaries, stop lines, pedestrian crossings), road signs (speed limits), etc.

As illustrated in FIG. 2, the right recognition camera 13 is a fish-eye camera that is built into a right door mirror. The right recognition camera 13 has a right white line lateral position detecting function. As illustrated in FIG. 2, the left recognition camera 14 is a fish-eye camera that is built into a left door mirror. The left recognition camera 14 has a left white line lateral position detecting function. Right white line lateral position refers to a length to an inside edge position of a right white line WR from a position of a vehicle width direction center line CL of a host vehicle A. Left white line lateral position refers to a length to an inside edge position of a left white line WL from a position of the vehicle width direction center line CL of the host vehicle A. Right white lines WR and left white lines WL are left and right lane boundaries, and a right white line lateral position and a left white line lateral position are the results of left and right lane boundary detection.

The lidar 15 and the radar 16 are disposed at positions at the front end of the host vehicle with the output wave illumination axes thereof pointing in front of the vehicle. By receiving waves that are reflected back, the lidar 15 and the radar 16 detect presence of objects in front of the host vehicle and distances to objects in front of the host vehicle are detected. The lidar 15 and the radar 16, which are two types of ranging sensors, combine to configure lidar/radar, and, for example, a laser radar, a millimeter wave radar, an ultrasonic radar, a laser range finder, etc., can be employed therefor. The lidar 15 and the radar 16 detect positions of and distances to objects, including objects in the travel path of the host vehicle, and objects outside of the travel path of the host vehicle (road structures, leading vehicles, trailing vehicles, oncoming vehicles, neighboring vehicles, pedestrians, bicycles, motor bikes).

As illustrated in FIG. 3, the lidar 15 are swingably provided at left and right positions at the front end of the host vehicle A, pointed obliquely downward and to the right and pointed obliquely downward and to the left. The lidar 15 have a right curb lateral position detecting function and a left curb lateral position detecting function. Right curb lateral position refers to a length to an inside edge position of a right curb ER from a position of the vehicle width direction center line CL of the host vehicle A. Left curb lateral position refers to a length to an inside edge position of a left curb EL from a position of the vehicle width direction center line CL of the host vehicle A. Right curbs ER and left curbs EL are left and right road edges, and a position a prescribed distance inside a right curb lateral position and a position a prescribed distance inside a left curb lateral position are the results of left and right lane boundary detection.

The surrounding environment recognition unit 2 receives, as inputs, image data from the recognition cameras 11, 12, 13, 14 and object data from the lidar/radar 15, 16. The surrounding environment recognition unit 2 includes a calibration processing unit 21 that generates calibration data for image data and object data, and an object recognition processing unit 22 that performs object recognition processing on the basis of the calibration data.

The calibration processing unit 21 estimates a parameter for image data from the recognition cameras 11, 12, 13, 14 and a parameter for object data from the lidar/radar 15, 16, and uses these parameters to generate and output image data and object data calibration data. For example, in the case of image data from the recognition cameras 11, 12, 13, 14, the calibration processing unit 21 uses the parameters to perform the correction, etc., of optical axes and lens distortion.

The object recognition processing unit 22 receives, as input, calibration data from the calibration processing unit 21, performs object recognition processing on the basis of the calibration data, and outputs recognition result data. The object recognition processing unit 22, for example, performs processing comparing image data and object data, and when it has been confirmed, using the object data, that an object is present at a position for an object candidate that is based on the image data, the object recognition processing unit 22 recognizes that an object is present and recognizes what the object is.

The navigation control unit 3 receives, as input, host vehicle position information from a GNSS antenna 31, combines GPS (global positioning system) utilizing satellite communications with map data, including road information, and generates a target route to a destination from a current position using a route search. In addition to displaying the generated target routes on a map, and the navigation control unit 3 outputs the target route information.

"GNSS" is short for "global navigation satellite system," and "GPS" is short for "global positioning system." Detailed configuration of the navigation control unit 3 will be described below.

The autonomous driving control unit 4 receives, as inputs, recognition result data from the object recognition processing unit 22 of the surrounding environment recognition unit 2, and target route information from the navigation control unit 3. The autonomous driving control unit 4 generates target vehicle speeds, target rates of acceleration, and target rates of deceleration on the basis of the input information. The autonomous driving control unit 4 derives drive control command values using a target rate of acceleration that was generated, and outputs a result of this derivation to a drive actuator 51. The autonomous driving control unit 4 derives brake control command values using a target rate of deceleration that was generated, and outputs a result of this derivation to a brake actuator 52. The autonomous driving control unit 4 derives steering control command values using target route information inputted thereto, and outputs a result of this derivation to a steering actuator 53.

The actuators 5 include the drive actuator 51, the brake actuator 52, and the steering actuator 53.

The drive actuator 51 receives, as input, a drive control command value from the autonomous driving control unit 4 and controls the drive force of a drive source. In other words, in the case of a vehicle with an engine, the drive actuator 51 is an engine actuator. In the case of a hybrid vehicle, the drive actuator 51 is an engine actuator and a motor actuator. In the case of an electric vehicle, the drive actuator 51 is a motor actuator.

The brake actuator 52 receives, as input, a brake control command value from the autonomous driving control unit 4 and controls the braking force of brakes. A hydraulic booster, an electric booster, etc., is used as the brake actuator 52.

The steering actuator 53 receives, as input, a steering control command value from the autonomous driving control unit 4 and controls the steering angle of a steering wheel. A steering angle control motor, etc., is used as the steering angle actuator 53.

Detailed Configuration of Navigation Control Unit

Detailed configuration of the navigation control unit 3, which sets a destination, derives an optimal target route, and displays the target route for autonomous driving, will be described below with reference to FIG. 1.

As illustrated in FIG. 1, the navigation control unit 3 comprises the GNSS antennas 31, 31, a position information processing unit 32, a destination setting unit 33, a map data storage unit 34, a route search processing unit 35, a target route corrector 36, and a display device 37.

The GNSS antennas 31, 31 are installed at front and rear positions on the host vehicle, whereby bearing information, this being a vehicle attitude angle of the host vehicle, is acquired using the positional relationship therebetween. When the reception of the GNSS antennas 31, 31 is poor, yaw rate information is acquired on the basis of sensor information from the onboard gyro sensor, and the acquired yaw rate information is integrated to interpolate bearing information.

The position information processing unit 32 performs processing for detecting the latitude and longitude of stopping positions of the host vehicle and travel positions of the host vehicle on the basis of satellite communication information inputted from the GNSS antennas 31, 31. Host vehicle position information from the position information processing unit 32 is outputted to the route search processing unit 35.

A destination for the host vehicle is inputted into, and set in, the destination setting unit 33 via, inter alia, a touch panel operation on a display screen of the display device 37 by the driver. Destination information from the destination setting unit 33 is outputted to the route search processing unit 35.

The map data storage unit 34 is a storage unit for so-called digital map data in which latitude/longitude and map information are associated. The map data includes road information that has been associated with respective points. The road information is defined by nodes and links that connect nodes together. The road information includes information that specifies roads according to road position/area, and information indicating a type of each road, a width of each road, and road geometry. The position of intersections, the directions of approach of intersections, intersection type, and other information relating to intersections is stored in association with respective identification information for each road link in the road information. Road type, road width, road geometry, whether forward progress is permitted, right-of-way relationships, whether passing is permitted (whether entering an adjacent lane is permitted), speed limit, and other information relating to roads is also stored in association with respective identification information for each road link in the road information.

The route search processing unit 35 receives, as input, host vehicle position information from the position information processing unit 32, destination information from the destination setting unit 33, and road map information (road map data) from the map data storage unit 34. The route search processing unit 35 generates a target route by performing a route cost computation, etc., on the basis of the road map information. GPS and a map can be used to generate a target route. Alternatively, instead of using GPS and a map, when a leading vehicle is present, a travel trajectory of the leading vehicle can be used as a target route. In such case, when the positional accuracy of GPS is low, using this travel trajectory decreases an amount of lateral/sideways movement by the target route corrector 36, described below, and vehicle behavior can be made smoother.

The target route corrector 36 receives, as inputs, recognition result data from the object recognition processing unit 22, and a target route from the route search processing unit 35. In addition to a target route, the target route corrector 36 receives, as inputs, (left and right) lateral direction distances to white lines, (left and right) lateral direction distances to stationary objects, (left and right) lateral direction distances to curbs, a direction indicator (turn signal) in-use-by-driver condition, a lane-change condition, and information such as vehicle speed. The target route corrector 36 detects lane boundaries of the lane in which the host vehicle travels on the basis of this input information. The target route corrector 36 compares positional relationships between lane boundaries that were detected and a target route on a map, and in situations where the target route is within a prescribed distance of a lane boundary, or in situations where the target route is on the opposite side of a lane boundary to the host vehicle, the target route is corrected with sideways movement in the lateral direction.

"Prescribed distance" refers to a distance at which a sense of unease would be imparted to the driver when the host vehicle approaches a lane boundary. For example, when the distance from the vehicle width direction center line of the host vehicle to a lane boundary is approximately 2 m (when the distance from a side of the host vehicle to a lane boundary is approximately 1 m). In situations where a target route is on the opposite side of a lane boundary to the host vehicle, the target route is corrected with sideways movement in the lateral direction no matter what the distance to the host vehicle.

The display device 37 receives, as inputs, map data information from the map data storage unit 34 and target route information from the target route corrector 36. The display device 37 displays a map, roads, a target route, a position of the host vehicle, and a destination on a display screen. In other words, during autonomous travel the display device 37 provides information visually representing the position of host vehicle on the map, such as for where the host vehicle is moving.

Overall Configuration of Target Route Corrector

Figure 4:
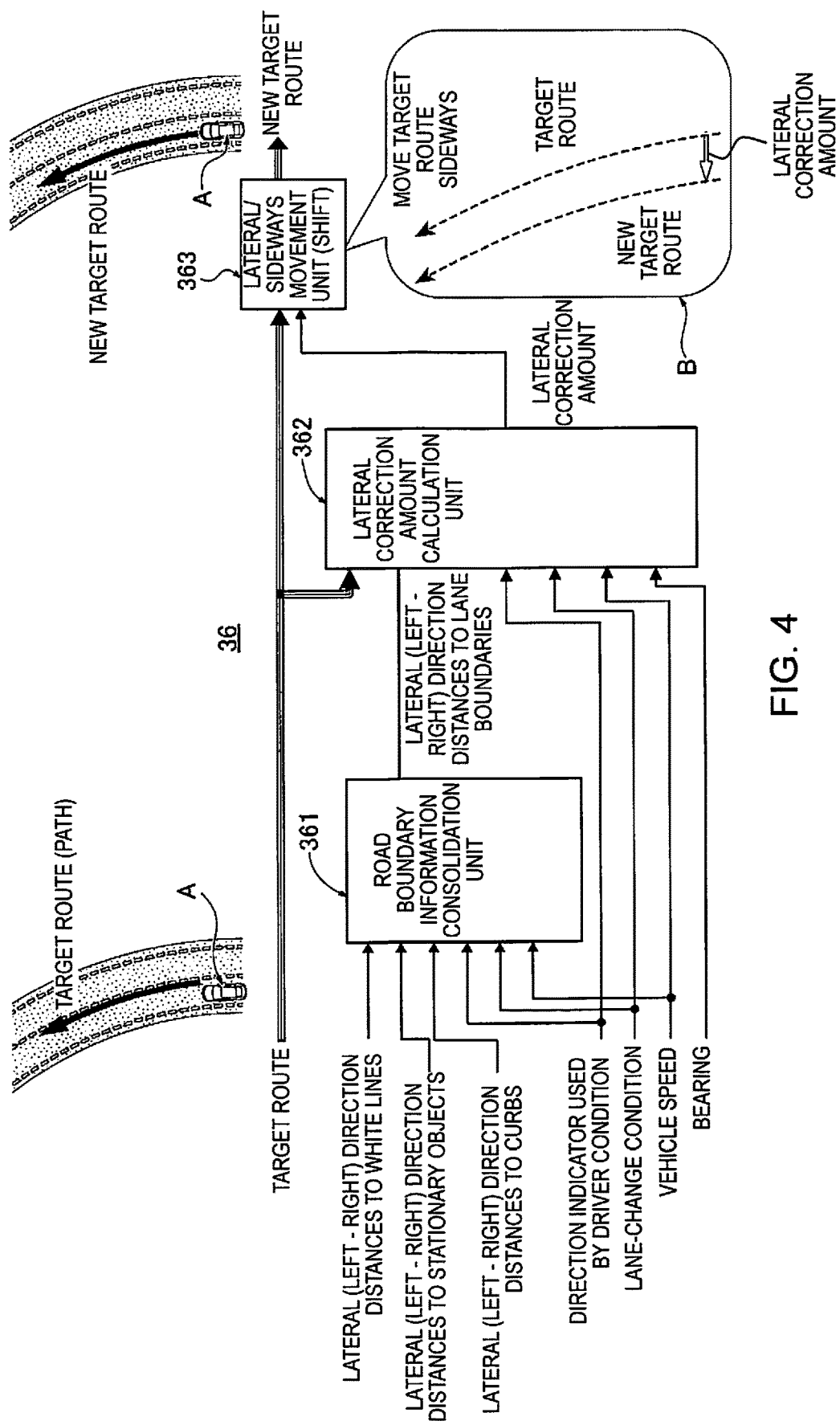
FIG. 4 is an overall block diagram illustrating a target route corrector of a navigation control unit of the first embodiment.

FIG. 4 illustrates the target route corrector 36 of the navigation control unit 3 (controller) in the first embodiment. Overall configuration of the target route corrector 36 will be described below with reference to FIG. 4.

The target route corrector 36 corrects navigational errors arising between a position of the host vehicle and a target route when the position of the host vehicle, detected using navigation information, is overlaid onto map information during autonomous travel. This correction is made with lateral/sideways movement of the target route. As illustrated in FIG. 4, the target route corrector 36 includes a road boundary information consolidation unit 361 (lane boundary detection unit), a lateral correction amount calculation unit 362, and a lateral/sideways movement unit 363.

The road boundary information consolidation unit 361 receives, as inputs, (left and right) lateral direction distances to white lines, (left and right) lateral direction distances to stationary objects, (left and right) lateral direction distances to curbs, a direction indicator (turn signal) in-use-by-driver condition, a lane-change condition, and information such as vehicle speed. The road boundary information consolidation unit 361 detects lane boundaries of the lane in which the host vehicle A travels, and outputs (left and right) lateral direction distances to the lane boundaries, with respect to the host vehicle A, to the lateral correction amount calculation unit 362.

The lateral correction amount calculation unit 362 receives, as inputs, a target route from the route search processing unit 35, (left and right) lateral direction distances to lane boundaries from the road boundary information consolidation unit 361, a direction indicator in-use-by-driver condition, a lane-change condition, and information such as vehicle speed and bearing. The lateral correction amount calculation unit 362 compares positional relationships between lane boundaries that have been detected and a target route on a map, and in situations where the target route is within a prescribed distance of a lane boundary, or in situations where the target route is on the opposite side of a lane boundary to the host vehicle A, calculates a lateral correction amount for the target route.

The lateral/sideways movement unit 363 receives, as inputs, a target route from the route search processing unit 35, and a lateral correction amount from the lateral correction amount calculation unit 362. As illustrated in bubble B in the lower right part of FIG. 4, upon the calculation of a lateral correction amount, the lateral/sideways movement unit 363 moves the target route sideways in the lateral direction by the lateral correction amount to correct the target route, and a new target route is generated. In correcting the target route with lateral/sideways movement, a degree of alignment between a direction of progress of the host vehicle A and the new target route is able to be increased when the direction of progress of the host vehicle A and the target route diverge from one another.

Detailed Configuration of Lateral Correction Amount Calculation Unit 362

Figure 5:
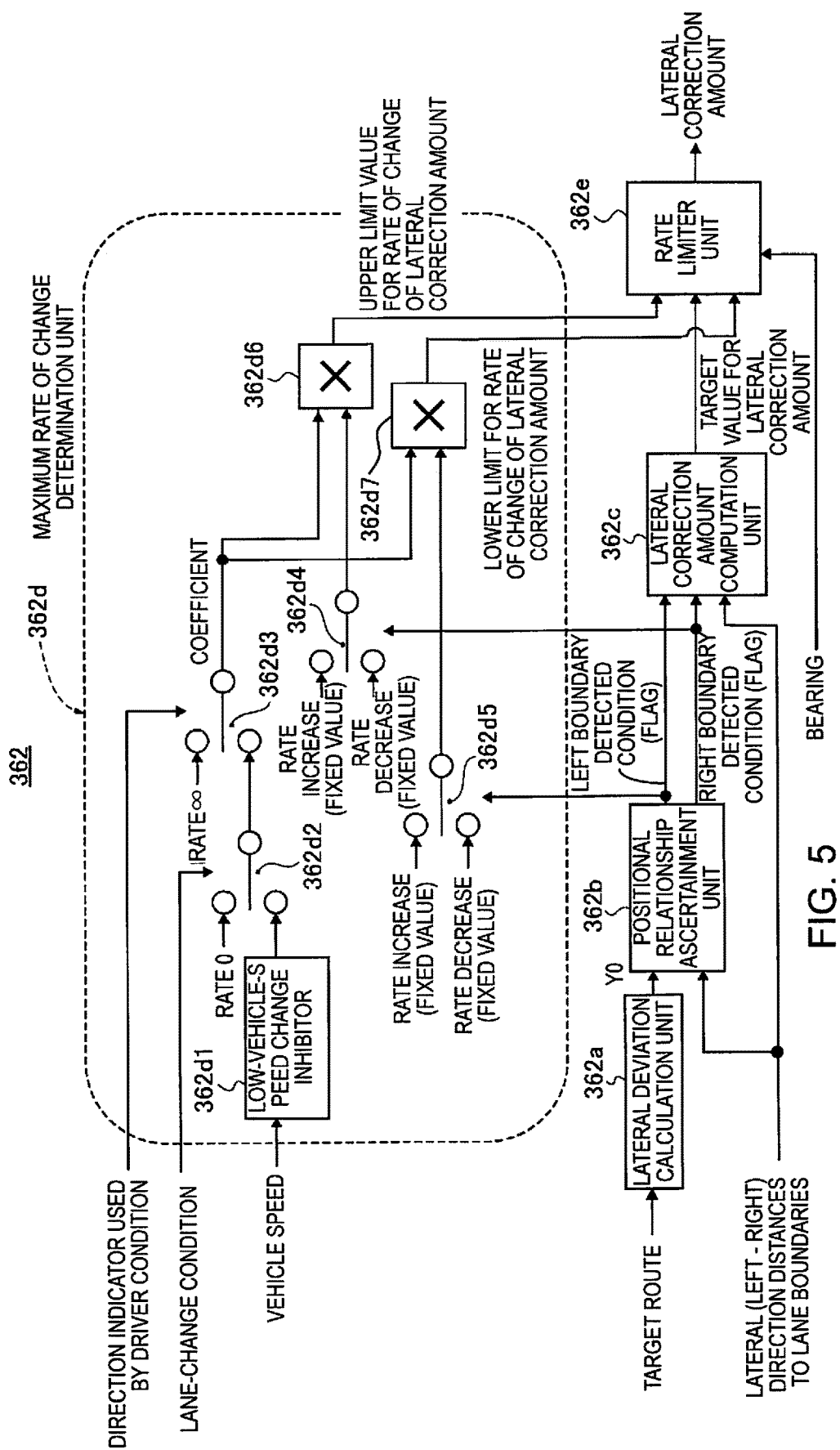
FIG. 5 is a detailed block diagram illustrating a lateral correction amount calculation unit in the target route corrector illustrated in FIG. 4.

FIG. 5 illustrates a lateral correction amount calculation unit 362 in the target route corrector 36. Detailed configuration of the lateral correction amount calculation unit 362 will be described below with reference to FIG. 5.

As illustrated in FIG. 5, the lateral correction amount calculation unit 362 includes a lateral deviation calculation unit 362a, a positional relationship ascertainment unit 362b, a lateral correction amount computation unit 362c, a maximum rate of change determination unit 362d, and a rate limiter 362e.

The lateral deviation calculation unit 362a, receives, as input, a target route from the route search processing unit 35, and calculates a lateral deviation Y0 between the target route and the host vehicle.

The positional relationship ascertainment unit 362b receives, as inputs, a lateral deviation Y0 from the lateral deviation calculation unit 362a, and (left and right) lateral direction distances to lane boundaries from the road boundary information consolidation unit 361. By comparing positional relationships between a target route and lane edges, the positional relationship ascertainment unit 362b comes to ascertain (grasp) the positional relationships between the target route and lane boundaries. In situations where the target route is within a prescribed distance of a (left) lane boundary, or in situations where the target route is on the opposite side of a (left) lane boundary to the host vehicle, the positional relationship ascertainment unit 362b outputs a left-boundary-detected condition (flag). In situations where the target route is within a prescribed distance of a (right) lane boundary, or in situations where the target route is on the opposite side of a (right) lane boundary to the host vehicle, the positional relationship ascertainment unit 362b outputs a right-boundary-detected condition (flag).

The lateral correction amount computation unit 362c receives, as inputs, a left-boundary-detected condition (flag) and a right-boundary-detected condition (flag) from the positional relationship ascertainment unit 362b, and (left and right) lateral direction distances to lane boundaries from the road boundary information consolidation unit 361. The lateral correction amount computation unit 362c computes a lateral correction amount so that a position of a target route and a position of the host vehicle are aligned, and then outputs a result of this computation as a target value for a lateral correction amount.

The maximum rate of change determination unit 362d receives, as inputs, a direction indicator in-use-by-driver condition, a lane-change condition, vehicle speed, a left-boundary-detected condition (flag), and a right-boundary-detected condition (flag). The maximum rate of change determination unit 362d determines a lower limit value and an upper limit value for a rate of change of the lateral correction amount (speed of movement of a target route). In other words, when correcting a target route with sideways movement in the lateral direction, the maximum rate of change determination unit 362d has functionality that not only restricts the speed of movement (rate of change of the lateral correction amount) at which the target route is moved sideways in the lateral direction to a prescribed speed, but also restricts the speed of movement in a manner that varies in accordance with circumstances.

The rate limiter unit 362e receives, as inputs, a target value for a lateral correction amount from the rate of change maximum value determination unit 362d, a lower limit value for the rate of change of the lateral correction amount and an upper limit value for the rate of change of the lateral correction amount from the maximum rate of change determination unit 362d, and a bearing. The rate of change of the lateral correction amount (speed of lateral/sideways movement of a target route) is used to apply a limit on the target value for a lateral correction amount, yielding a lateral correction amount.

The maximum rate of change determination unit 362d includes a low-vehicle-speed change inhibitor 362d1, a first rate-switching unit 362d2, a second rate-switching unit 362d3, a third rate-switching unit 362d4, a fourth rate-switching unit 362d5, a first rate-summing unit 362d6, and a second rate-summing unit 362d7.

The low-vehicle-speed change inhibitor 362d1 receives, as input, vehicle speed, and, if the vehicle speed of the host vehicle drops, chooses a vehicle-speed-contingent rate of change so that the speed of movement of a target route decreases in accordance with the drop in vehicle speed. If the host vehicle stops, the low-vehicle-speed change inhibitor 362d1 sets the vehicle-speed-contingent rate of change to zero.

Using the lane-change condition as a trigger, the first rate-switching unit 362d2 selects a vehicle-speed-contingent rate of change in normal travel scenarios not involving a lane change, and switches the rate of change to zero when input with a lane-change condition.

Using the direction indicator in-use-by-driver condition, the second rate-switching unit 362d3 switches to the rate of change from the first rate-switching unit 362d2 when the direction indicator is not in use, and switches the rate of change to infinity when input with a direction indicator in-use condition.

Using a right-boundary-detected condition (flag) as a trigger, the third rate-switching unit 362d4 switches between a rate increase (fixed value) and a rate decrease (fixed value).

Using a left-boundary-detected condition (flag) as a trigger, the fourth rate-switching unit 362d5 switches between a rate increase (fixed value) and a rate decrease (fixed value).

The first rate-summing unit 362d6 receives, as inputs, a rate of change from the second rate-switching unit 362d3 and a rate of change from the third rate-switching unit 362d4, and sums both rates of change to calculate an upper limit value for the rate of change of the lateral correction amount.

The second rate-summing unit 362d7 receives, as inputs, a rate of change from the second rate-switching unit 362d3 and a rate of change from the fourth rate-switching unit 362d5, and sums both rates of change to calculate an upper limit value for the rate of change of the lateral correction amount.

In the maximum rate of change determination unit 362d, the speed of movement (rate of change) of a target route, when corrected with lateral/sideways movement, is controlled as given below.

(a) When moving a target route sideways in the lateral direction, if the host vehicle performs a lane change, the speed of movement of the target route is set to zero and a sideways movement amount is held during the lane change (first rate-switching unit 362d2).

(b) When moving a target route sideways in the lateral direction, if the vehicle speed of the host vehicle drops, the speed of movement of the target route is decreased in accordance with the drop in vehicle speed (low-vehicle-speed change inhibitor 362d1).

(c) When moving a target route sideways in the lateral direction, if the host vehicle stops, the speed of movement of the target route is set to zero and a sideways movement amount is held (low-vehicle-speed change inhibitor 362d1).

(d) When moving a target route sideways in the lateral direction, if left and right lane edges are not detected near the host vehicle, the speed of movement of the target route to the left and right is decreased (third and fourth rate-switching units 362d4, 362d5).

(e) When moving a target route sideways in the lateral direction, if a lane edge is detected near the host vehicle on only the left side, the speed of movement of the target route to the left is decreased and the speed of movement of the target route to the right is increased (third and fourth rate-switching units 362d4, 362d5).

(f) When moving a target route sideways in the lateral direction, if a lane edge is detected near the host vehicle on only the right side, the speed of movement of the target route to the left is increased and the speed of movement of the target route to the right is decreased (third and fourth rate-switching units 362d4, 362d5).

(g) When moving a target route sideways in the lateral direction, if left and right lane edges are detected near the host vehicle, the speed of movement of the target route to the left and right is increased (third and fourth rate-switching units 362d4, 362d5).

Detailed Configuration of Rate Limiter Unit

Figure 6:
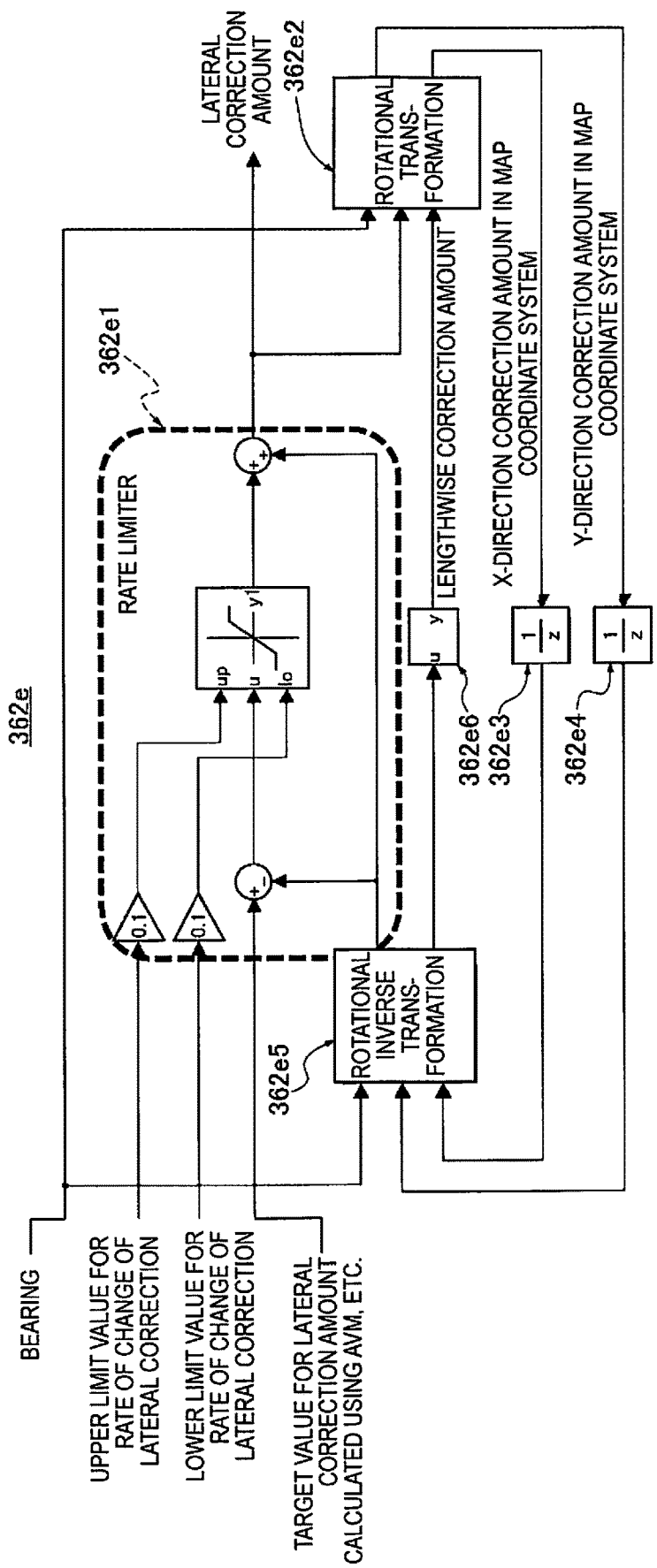
FIG. 6 is a detailed block diagram illustrating a rate limiter unit in the lateral correction amount calculation unit illustrated in FIG. 5.
Figure 7:
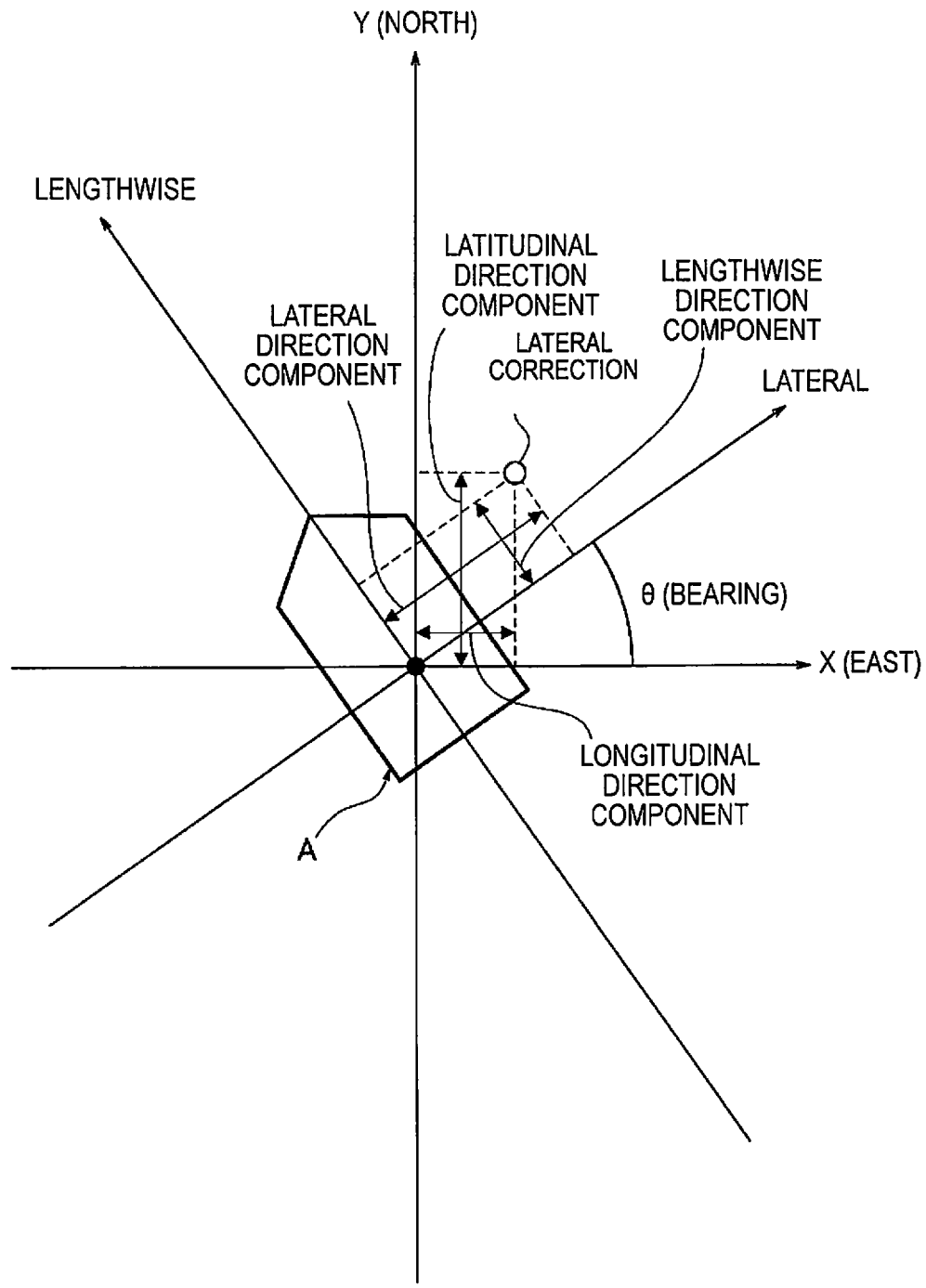
FIG. 7 is an explanatory diagram illustrating a map coordinate system, a vehicle coordinate system, bearing, a latitudinal direction component and a longitudinal direction component of a lateral correction amount in the map coordinate system, and a lateral direction component and a lengthwise direction component of a lateral correction amount in the vehicle coordinate system.

FIG. 6 illustrates the rate limiter unit 362e in the lateral correction amount calculation unit 362 illustrated in FIG. 5. FIG. 7 illustrates a map coordinate system, a vehicle coordinate system, bearing, and other elements needed to explain the rate limiter unit 362e. The detailed configuration of the rate limiter unit 362e will be described below with reference to FIGS. 6 and 7.

As illustrated in FIG. 6, the rate limiter unit 362e includes a rate limiter 362e1, a rotational transformation unit 362e2, an X-direction correction amount retrieval unit 362e3, a Y-direction correction amount retrieval unit 362e4, a rotational inverse transformation unit 362e5, and a lengthwise correction amount reducing unit 362e6.

The rate limiter 362e1 receives, as inputs, an upper limit value for a rate of change of a lateral correction amount, a lower limit value for the rate of change of a lateral correction amount, a target value for a lateral correction amount that has been calculated using the AVM, etc., and an amount of bearing-based lateral correction from the rotational inverse transformation unit 362e5. The rate limiter 362e1 limits the target value for the lateral correction amount using the upper limit value for the rate of change, the lower limit value for the rate of change, and the amount of bearing-based lateral correction, and then outputs a final lateral correction amount.

The rotational transformation unit 362e2 receives, as inputs, a bearing, a lateral correction amount from the rate limiter 362e1, and an amount of lengthwise correction (a lengthwise direction component of the lateral correction amount) from the lengthwise correction amount reducing unit 362e6. As illustrated in FIG. 7, using the bearing, the rotational transformation unit 362e2 performs a rotational transformation of the vehicle-coordinate-system-based lateral correction amount from the rate limiter 362e1 into a map coordinate system, and outputs an amount of correction in an X-direction (a longitudinal direction component of the lateral correction amount), and an amount correction in a Y-direction (a latitudinal direction component of the lateral correction amount), of the map coordinate system.

The X-direction correction amount retrieval unit 362e3 receives, as input, an amount of correction in the X-direction of the map coordinate system (a longitudinal direction component of a lateral correction amount) from the rotational transformation unit 362e2. The X-direction correction amount retrieval unit 362e3 also retrieves an amount of correction in the X-direction (a longitudinal direction component of a lateral correction amount) from one step prior.

The Y-direction correction amount retrieval unit 362e4 receives, as input, an amount of correction in the Y-direction of the map coordinate system (a latitudinal direction component of a lateral correction amount) from the rotational transformation unit 362e2. The Y-direction correction amount retrieval unit 362e4 also retrieves an amount of correction in the Y-direction (a latitudinal direction component of the lateral correction amount) from one step prior.

The rotational inverse transformation unit 362e5 receives, as inputs, a bearing, an amount of correction in the X-direction (a longitudinal direction component of a lateral correction amount) from one step prior, and an amount of correction in the Y-direction (a latitudinal direction component of the lateral correction amount) from one step prior. Using the bearing, the inverse rotational transformation unit 362e5 performs a rotational inverse transformation of the map-coordinate-system-based lateral correction amount into the vehicle coordinate system, and outputs a lateral correction amount in the vehicle coordinate system (a lateral direction component in the vehicle coordinate system), and an amount of lengthwise correction in the vehicle coordinate system (a lengthwise direction component in the vehicle coordinate system).

The lengthwise correction amount reducing unit 362e6 receives, as input, an amount of lengthwise correction (a lengthwise direction component in the vehicle coordinate system) from the rotational inverse transformation unit 362e5, and outputs, to the rotational transformation unit 362e2, an amount of lengthwise correction that is gradually reduced by a reduction coefficient less than 1.

Next, the operation will be described. The operation of the first embodiment will be described under the headings "Operation for correcting a position error in a comparative example" and "Operation for correcting a position error in the first embodiment."

Operation for Correcting a Position Error in a Comparative Example

Figure 8:
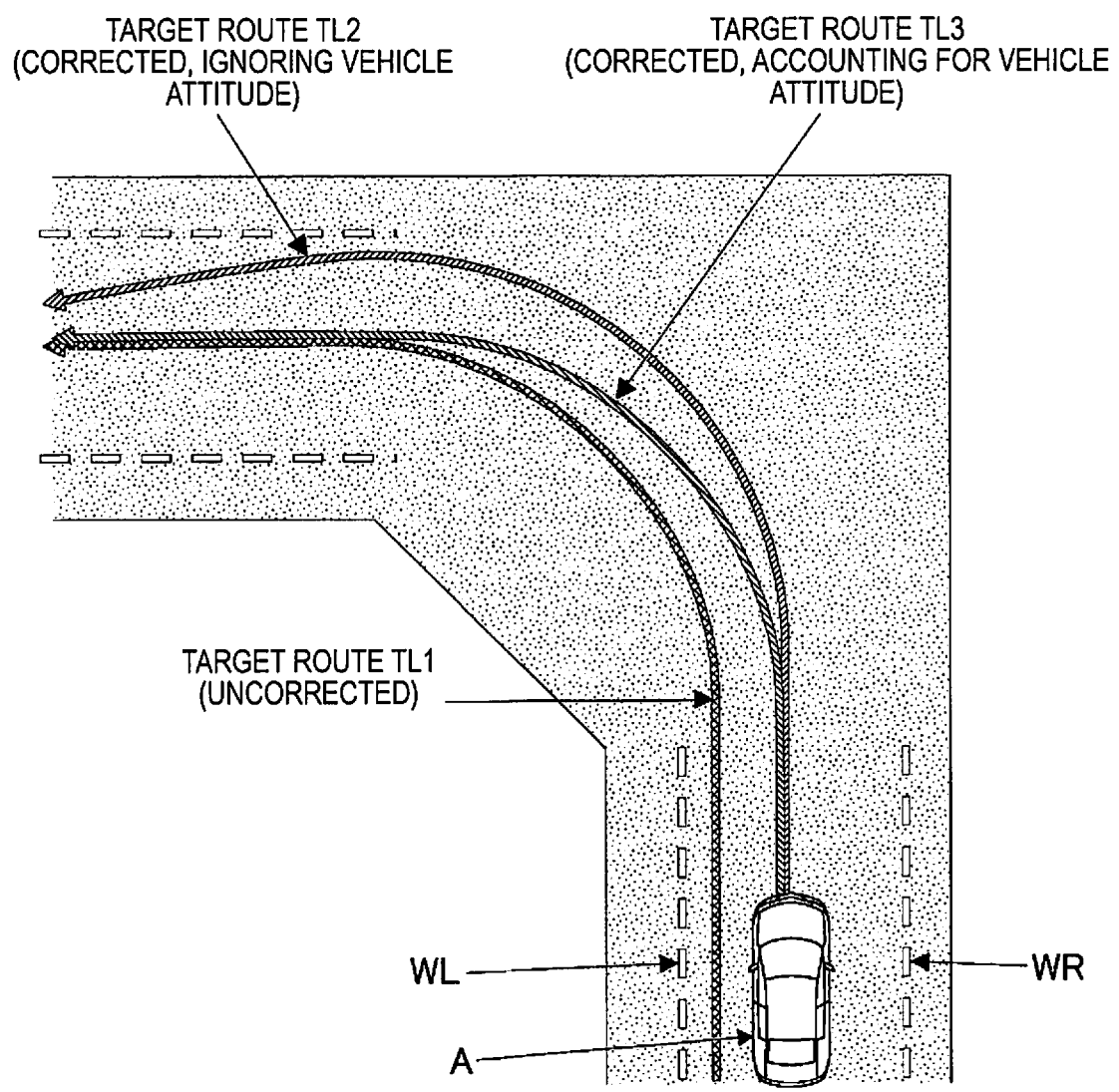
FIG. 8 is an explanatory target route contrast diagram illustrating a comparison of a target route TL1 (uncorrected), a target route TL2 (corrected, ignoring vehicle attitude), and a target route TL3 (corrected, accounting for vehicle attitude) generated in an intersection without white lines.
Figure 9:
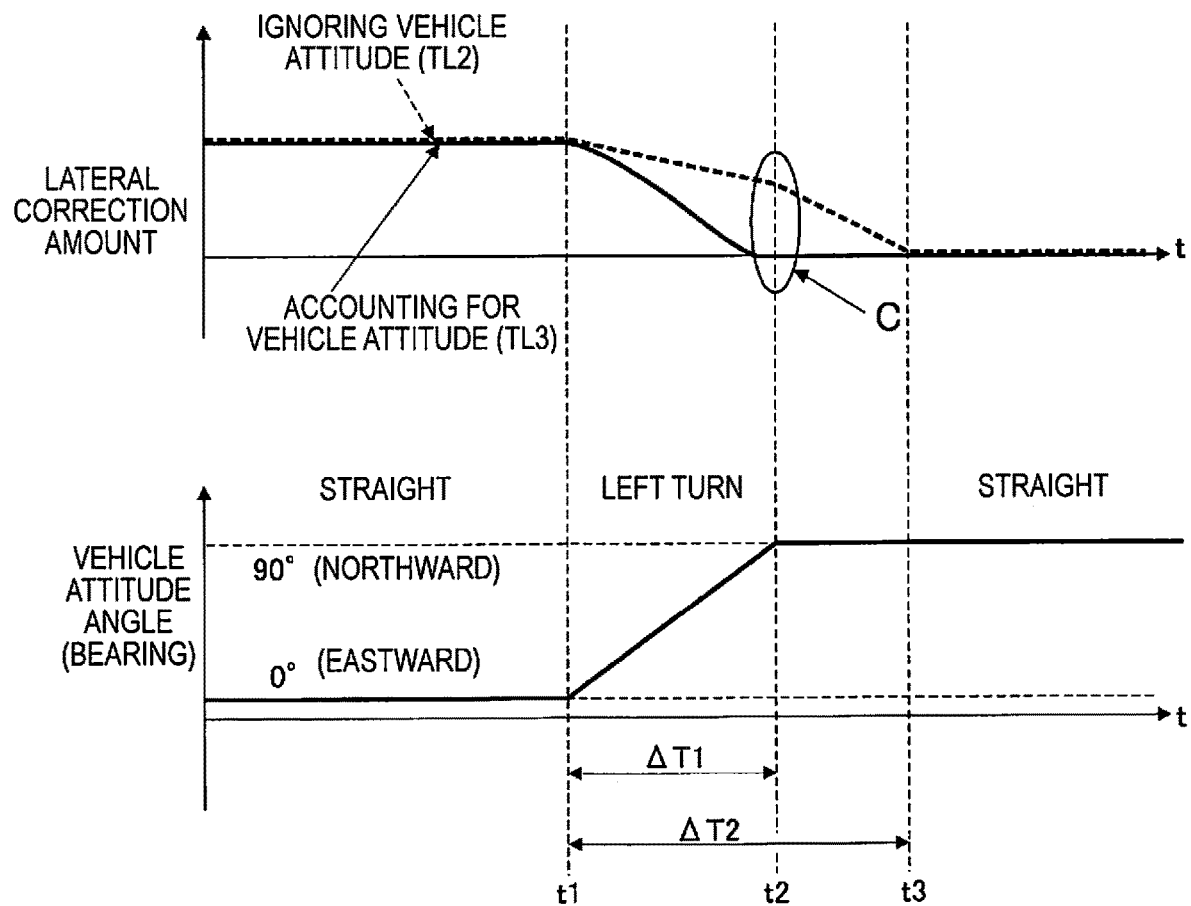
FIG. 9 are time charts illustrating, in an intersection without white lines, change-in-amount-of-lateral-correction attributes comparing the target route TL2 (corrected, ignoring vehicle attitude) and the target route TL3 (corrected, accounting for vehicle attitude), and change-in-vehicle-attitude-angle (bearing) attributes according to the target route TL3 (corrected, accounting for vehicle attitude).

FIG. 8 illustrates a comparison of a target route TL1 (uncorrected) and a target route TL2 (corrected, ignoring vehicle attitude) generated in an intersection without white lines. FIG. 9 illustrates, in an intersection without white lines, change-in-amount-of-lateral-correction attributes comparing the target route TL2 (corrected, ignoring vehicle attitude) and the target route TL3 (corrected, accounting for vehicle attitude). Operation for correcting a position error in the comparative example will be described below with reference to FIGS. 8 and 9.

The comparative example corrects the uncorrected target route TL1 using sideways movement, but this correction does not include bearing in input information and vehicle attitude is ignored.

With GPS positioning, over short intervals of time, target routes are offset by a given value in some direction when viewed in a map coordinate system. However, when attempting to correct this, although it is possible to correct a component normal to the direction of progress of a host vehicle through the use of various sensors, such correction is not easy because information relating to the direction of progress is sparse. To address this, as in the comparative example, it is conceivable to deal only with a component in a normal direction (called a lateral correction amount) and perform updates using road boundary information. However, when performing a right or left turn in an intersection, road boundaries cannot be obtained because white lines are not normally present in intersections, and because the direction of progress also changes, proper correction cannot be performed.

That is, in the comparative example, in which correction is performed using sideways movement but bearing is not included in input information and vehicle attitude is ignored, as illustrated in FIG. 8, compared with the uncorrected target route TL1, the corrected target route TL2 (corrected, ignoring vehicle attitude) veers greatly toward an outside of a curve in a section where curvature changes. The position of the host vehicle A upon leaving the intersection is thus away from a center line between left and right white lines.

Consequently, as illustrated in the change-in-amount-of-lateral-correction attributes for target route TL2 (corrected, ignoring vehicle attitude) in FIG. 9, in intersections without white lines, an amount-of-time-required ΔT2 (from time t1 to time t3) is needed to leave the intersection and enter straight-ahead travel from when bearing starts to change toward a side of a left turn at time t1.

[Operation for Correcting a Position Error in the First Embodiment]

FIG. 8 illustrates a comparison of the target route TL1 (uncorrected), the target route TL2 (corrected, ignoring vehicle attitude), and the target route TL3 (corrected, accounting for vehicle attitude) generated in an intersection without white lines. FIG. 9 illustrates, in an intersection without white lines, change-in-amount-of-lateral-correction attributes comparing the target route TL2 (corrected, ignoring vehicle attitude) and the target route TL3 (corrected, accounting for vehicle attitude), and change-in-vehicle-attitude-angle (bearing) attributes according to the target route TL3 (corrected, accounting for vehicle attitude). Operation for correcting a position error in the first embodiment will be described below with reference to FIGS. 6, 8, and 9.

To begin, operation of the rate limiter unit 362e for calculating an amount of bearing-based lateral correction will be described. The rate limiter 362e1 receives, as inputs, an upper limit value for a rate of change of a lateral correction amount, a lower limit value for the rate of change of a lateral correction amount, a target value for a lateral correction amount that has been calculated using the AVM, etc., and an amount of bearing-based lateral correction from the rotational inverse transformation unit 362e5. The rate limiter 362e1 limits the target value for the lateral correction amount using the upper limit value for the rate of change, the lower limit value for the rate of change, and the amount of bearing-based lateral correction, and then outputs a final lateral correction amount. At such time, an amount of bearing-based lateral correction from the rotational inverse transformation unit 362e5 is obtained using the process described below.

The rotational transformation unit 362e2 receives, as inputs, a bearing, a lateral correction amount from the rate limiter 362e1, and an amount of lengthwise correction (a lengthwise direction component of the lateral correction amount) from the lengthwise correction amount reducing unit 362e6. Using the bearing, the rotational transformation unit 362e2 performs a rotational transformation of the vehicle-coordinate-system-based lateral correction amount from the rate limiter 362e1 into a map coordinate system, and outputs an amount of correction in an X-direction (a longitudinal direction component of the lateral correction amount), and an amount correction in a Y-direction (a latitudinal direction component of the lateral correction amount), of the map coordinate system.

The X-direction correction amount retrieval unit 362e3 receives, as input, an amount of correction in the X-direction of the map coordinate system (a longitudinal direction component of a lateral correction amount) from the rotational transformation unit 362e2, and retrieves an amount of correction in the X-direction (a longitudinal direction component of a lateral correction amount) from one step prior. The Y-direction correction amount retrieval unit 362e4 receives, as input, an amount of correction in the Y-direction of the map coordinate system (a latitudinal direction component of a lateral correction amount) from the rotational transformation unit 362e2, and retrieves an amount of correction in the Y-direction (a latitudinal direction component of a lateral correction amount) from one step prior.

The rotational inverse transformation unit 362e5 receives, as inputs, the bearing, an amount of correction in the X-direction (a longitudinal direction component of a lateral correction amount) from one step prior, and an amount of correction in the Y-direction (a latitudinal direction component of the lateral correction amount) from one step prior. Using the bearing, the rotational inverse transformation unit 362e5 performs a rotational inverse transformation of the map-coordinate-system-based lateral correction amount into the vehicle coordinate system, and outputs a lateral correction amount in the vehicle coordinate system (a lateral direction component in the vehicle coordinate system), and an amount of lengthwise correction in the vehicle coordinate system (a lengthwise direction component in the vehicle coordinate system). At such time, the lengthwise correction amount reducing unit 362e6 receives, as input, an amount of lengthwise correction (a lengthwise direction component in the vehicle coordinate system) from the rotational inverse transformation unit 362e5, and outputs, to the rotational transformation unit 362e2, an amount of lengthwise correction that is gradually reduced by a reduction coefficient less than 1.

In this way, in the first embodiment, a lateral correction amount is handled in terms of both a longitudinal direction component and a latitudinal direction component as seen in a map coordinate system. When changing the lateral movement speed of a target route according to the bearing of the host vehicle, an amount of vehicle-coordinate-system-based lateral correction is rotationally transformed into the map coordinate system using the bearing. At such time, only the lateral direction component, this being a component in a direction normal to the direction of progress in the vehicle coordinate system, is updated. The lengthwise direction component, this being a component in the direction of progress, is left unchanged. An inverse rotational transformation is subsequently performed that reverts the map coordinate system to the vehicle coordinate system. In further detail, when the lateral movement speed of a target route is changed according to the bearing of the host vehicle, the lateral correction amount in a given control step is stored in an X, Y coordinate system, this being a map coordinate system. In the following step, an X-direction component and a Y-direction component are retrieved and inversely rotationally transformed by an amount equal to the vehicle attitude angle (bearing) at that step, whereby these components are transformed into lengthwise and lateral components in the vehicle coordinate system. The lengthwise and lateral components are compared with a target value for a lateral correction amount that has been newly obtained using lane boundary detection results, and a final lateral correction amount in that step is calculated. Then, another rotational transformation by an amount equal to the vehicle attitude angle (bearing) is performed, and a lateral correction amount in the X, Y coordinate system is calculated. This process is repeated.

Thus, in the first embodiment, in which correction is performed using lateral movement in which bearing is included in input information and vehicle attitude is taken into account, as illustrated in FIG. 8, compared with the uncorrected target route TL1, the corrected target route TL3 (corrected, accounting for vehicle attitude) is kept from veering toward an outside of a curve in a section where curvature changes. The position of the host vehicle A upon leaving the intersection is thus substantially aligned with a center line between left and right white lines.

Consequently, as illustrated in the change-in-amount-of-lateral-correction attributes for target route TL3 (corrected, accounting for vehicle attitude) enclosed at arrow C in FIG. 9, in an intersection without white lines, the drop in the lateral correction amount increases in slope, and the speed of lateral/sideways movement increases. As a result, an amount-of-time-required $\Delta T1$ ($<\Delta T2$) (from time t1 to time t2) to leave the intersection and enter straight-ahead travel from when bearing starts to change toward a side of a left turn at time t1 is shortened.

Next, the effects of the present disclosure will be described. The effects given below by way of example are achieved with the method and device for correcting a position error of an autonomous vehicle of the first embodiment.

(1) A controller (the navigation control unit 3) is provided that corrects error arising between a position of a host vehicle and a target route during drive-assisted travel (during autonomous travel). In a method for correcting a position error of a drive-assisted vehicle (the autonomous vehicle), a lane boundary of a lane in which the host vehicle travels is detected. Positional relationships between a detected lane boundary and the target route on a map are compared to calculate a target value for a lateral correction amount of the target route. A lateral movement speed of the target route at which the target value for a lateral correction amount is to be obtained is changed according to a bearing of the host vehicle, bearing being a vehicle attitude angle, to calculate a lateral correction amount. The target route is corrected by moving the target route sideways in a lateral direction by an amount equal to the lateral correction amount FIG. 8). Accordingly, a method for correcting a position error of a drive-assisted vehicle (the autonomous vehicle) can be provided with which a position of a host vehicle after having passed through an intersection via a right or left turn is made to approach a lane center even in intersections without white lines or a pedestrian crossing.

(2) The lateral correction amount is handled in terms of both a longitudinal direction component and a latitudinal direction component as seen in a map coordinate system. When changing the lateral movement speed of the target route according to the bearing of the host vehicle, an amount of vehicle-coordinate-system-based lateral correction is rotationally transformed into the map coordinate system using the bearing, and at such time, only a lateral direction component, this being a component in a direction normal to a direction of progress in the vehicle coordinate system, is updated, and a lengthwise direction component, this being a component in the direction of progress, is left unchanged. An inverse rotational transformation that reverts the map coordinate system to the vehicle coordinate system is subsequently performed (FIG. 6). Accordingly, on top of the effect of (1), by treating a lateral correction amount in the map coordinate system not just as a value, but as a vector value that has a direction, it is possible to deal with more complex attitude changes outside of intersections, such as travel through S-curves.

(3) When changing the lateral movement speed of the target route according to the bearing of the host vehicle, a lateral correction amount in a given control step is stored in an X, Y coordinate system, this being a map coordinate system, then, in the following step, an X-direction component and a Y-direction component are retrieved, inversely rotationally transformed by an amount equal to a vehicle attitude angle (bearing) at that step, and transformed into lengthwise and lateral components in the vehicle coordinate system, then the lengthwise and lateral components are compared with a target value for a lateral correction amount that has been newly obtained using lane boundary detection results, a final lateral correction amount in that step is calculated, and then another rotational transformation by an amount equal to the vehicle attitude angle (bearing) is performed, and a lateral correction amount in the X, Y coordinate system is calculated (FIG. 6). Accordingly, on top of the effect of (2), through repeatedly performing this calculation process during travel through a curve in which bearing changes with time, it is possible to achieve vehicle attitude angle changes that are highly responsive to curves.

(4) The lengthwise direction component is gradually reduced as time progresses (FIG. 6). Accordingly, on top of the effect of (2) or (3), generally, by reducing the lengthwise direction component of a lateral correction amount being held, an amount of lengthwise direction divergence of target route information can be kept from increasing with time. That is, there is change in the amount of lengthwise direction divergence of target routes in situations where lengthwise direction corrections are not easily made using only information for lane boundaries (the white lines) and a long amount of time has passed.

(5) Bearing information for the host vehicle, bearing being a vehicle attitude angle, is acquired using a positional relationship between two GNSS antennas 31, 31 installed on the host vehicle. When the reception of the GNSS antennas 31, 31 is poor, yaw rate information is acquired on the basis of sensor information from the onboard gyro sensor, and the acquired yaw rate information is integrated to interpolate bearing information (FIG. 1). Accordingly, on top of the effects of (1) to (4), correction based on lateral/sideways movement that employs bearing can continue even when GPS reception is poor.

(6) A controller (the navigation control unit 3) is provided that corrects error arising between a position of a host vehicle and a target route during drive-assisted travel (during autonomous travel). In a device for correcting a position error of a drive-assisted vehicle (the autonomous vehicle), a controller (the navigation control unit 3) includes a target route corrector 36 that corrects the target route. The target route corrector 36 includes a lane boundary detection unit (the road boundary information consolidation unit 361), a lateral correction amount calculation unit 362, and a lateral/sideways movement unit 363. The lane boundary detection unit (the road boundary information consolidation unit 361) detects a lane boundary of a lane in which the host vehicle travels. The lateral correction amount calculation unit 362 calculates a target value for a lateral correction amount of the target route by comparing positional relationships between lane boundary detection results and the target route on a map, and changes a lateral movement speed of the target route to calculate the target value for the lateral correction amount according to a bearing of the host vehicle in which the bearing being a vehicle attitude angle. The lateral/sideways movement unit 363 corrects the target route by moving the target route sideways in a lateral direction by an amount equal to the lateral correction amount upon the calculation of the lateral correction amount (FIG. 4). Accordingly, a device for correcting a position error of a drive-assisted vehicle (the autonomous vehicle) can be provided with which a position of a host vehicle after having passed through an intersection via a right or left turn is made to approach a lane center even in intersections without white lines or a pedestrian crossing.

In the foregoing, a method and device for correcting a position error of a drive-assisted vehicle of the present disclosure was described with reference to the first embodiment. However, the specific configuration thereof is not limited to that of the first embodiment, and design modifications, additions, etc., are possible without departing from the spirit of the invention as set forth in the accompanying claims.

In the first embodiment, an example was presented in which a lateral correction amount is calculated, and only correction of a target route that uses lateral/sideways movement is performed. However, if a lengthwise direction component of a lateral correction amount is acquired through use of a bearing, not just a lateral correction of the target route, but a lengthwise correction whereby the target route is moved sideways in the lengthwise direction by an amount equal to the lengthwise direction component can be applied to the target route. If such a lengthwise correction is applied, distances to stop lines, etc., can be calculated from map information more accurately, and the host vehicle can come to a smoother stop.

In the first embodiment, an example was presented in which the navigation control unit 3 is used as a controller that generates a target route to a destination from the current position of a host vehicle. However, an autonomous driving control unit could be used as a controller that generates a target route to a destination from the current position of a host vehicle. The target route generation functionality can also be split into two, whereby part of this functionality is assigned to a navigation control unit, with the remainder being assigned to an autonomous driving control unit.

In the first embodiment, an example was presented in which the method and device for correcting a position error of the present disclosure are applied to an autonomous vehicle in which steering/drive/braking are automatically controlled according to an autonomous driving mode selection. However, the method and device for correcting a position error of the present disclosure can be applied to any drive-assisted vehicle that assists any part of a steering operation/drive operation/braking operation by a driver. In short, the method and device for correcting a position error of the present disclosure can be applied to any vehicle that assists the driving of a driver by correcting navigational system position error.

The invention claimed is:

1. A vehicle position control method for correcting a position error of a drive-assisted host vehicle comprising a controller that corrects error arising between a position of the host vehicle and a target route during drive-assisted travel, the vehicle position correction method comprising:

detecting a lane boundary of a lane in which the host vehicle travels;

calculating a target value for a lateral correction amount of the target route by comparing positional relationships between lane boundary detection results and the target route on a map;

changing a lateral movement speed of the target route to calculate the target value for the lateral correction amount according to a bearing of the host vehicle in which the bearing being a vehicle attitude angle;

correcting the target route by moving the target route sideways in a lateral direction by an amount equal to the lateral correction amount; and controlling the host vehicle based on the corrected target route.

2. The vehicle position control method according to claim 1, wherein the lateral correction amount is handled in terms of both a longitudinal direction component and a latitudinal direction component as seen in a map coordinate system;

when changing the lateral movement speed of the target route according to the bearing of the host vehicle, an amount of vehicle-coordinate-system-based lateral correction is rotationally transformed into the map coordinate system using the bearing, and at such time, only a lateral direction component, which is a component in a direction normal to a direction of progress in a vehicle coordinate system, is updated, and a lengthwise direction component, which is a component in the direction of progress, is left unchanged; and an inverse rotational transformation that reverts the map coordinate system to the vehicle coordinate system is subsequently performed.

3. The vehicle position control method according to claim 2, wherein when changing the lateral movement speed of the target route according to the bearing of the host vehicle, the lateral correction amount in a given control step is stored in an X, Y coordinate system, which is a map coordinate system, then, in a following step, an X-direction component and a Y-direction component are retrieved, inversely rotationally transformed by an amount equal to the vehicle attitude angle at that step, and transformed into lengthwise and lateral components in the vehicle coordinate system, then the lengthwise and lateral components are compared with a target value for the lateral correction amount that has been newly obtained using lane boundary detection results, a final lateral correction amount in that step is calculated, and then another rotational transformation by an amount equal to the vehicle attitude angle is performed, and the lateral correction amount in the X, Y coordinate system is calculated.

4. The vehicle position control method according to claim 2, wherein the lengthwise direction component is reduced as time progresses.

5. The vehicle position control method claim 1, further comprising acquiring bearing information for the host vehicle using a positional relationship between two GNSS antennas installed on the host vehicle; and acquiring yaw rate information based on sensor information from an onboard gyro sensor when the reception of the GNSS antennas is poor, and interpolating the bearing information by using the yaw rate information that was acquired.

6. A vehicle position control device for correcting a position error of a drive-assisted host vehicle comprising:

a controller that corrects error arising between a position of the host vehicle and a target route during drive-assisted travel; and an autonomous driving controller that receives the target route from the controller and controls the host vehicle, the controller including a target route corrector that corrects a target route;

the target route corrector including a lane boundary detection unit that detects a lane boundary of a lane in which the host vehicle travels, a lateral correction amount calculation unit that calculates a target value for a lateral correction amount of the target route by comparing positional relationships between lane boundary detection results and the target route on a map, and changes a lateral movement speed of the target route to calculate the target value for the lateral correction amount according to a bearing of the host vehicle in which the bearing being a vehicle attitude angle, and a lateral/sideways movement unit that corrects the target route by moving the target route sideways in a lateral direction by an amount equal to the lateral correction amount upon the calculation of the lateral correction amount, the autonomous driving controller being configured to control the host vehicle based on the corrected target route.

* * * * *